United States Patent Office 2,897,055
Patented July 28, 1959

2,897,055
SULFUR TETRAFLUORIDE ADDUCTS

Earl L. Muetterties, Chadds Ford, Pa., and William D. Phillips and William Channing Smith, Wilmington, Del., assignors to E. I. du Pont de Nemours and Company, Wilmington, Del., a corporation of Delaware No Drawing. Application December 28, 1956
Serial No. 631,038

10 Claims. (Cl. 23—205)

This invention relates to sulfur tetrafluoride. More particularly, it relates to a new process for preparing pure sulfur tetrafluoride from the impure material and to new addition compounds of sulfur tetrafluoride resulting from the process. It also is concerned with a novel method of storing sulfur tetrafluoride.

Sulfur tetrafluoride is a highly reactive and versatile substance which can be used as an intermediate in the preparation of other fluorine-containing compounds. Thus it may be employed as described in U.S. 2,709,186 to prepare tetrafluoroethylene, a technically valuable product from which a series of fluorocarbon polymers is obtained.

Methods for preparing sulfur tetrafluoride frequently result in a product which contains sulfur hexafluoride. The latter is also a desirable compound since its outstanding electrical properties make it valuable as a gaseous dielectric.

Sulfur tetrafluoride has heretofore been purified by trap-to-trap distillation in a vacuum or by fractional distillation in a highly efficient column under superatmospheric pressure. Fractional sublimations in highly evacuated systems have also been used to separate the tetrafluoride and hexafluoride. Sulfur hexafluoride as been freed of sulfur tetrafluoride by passage through an aqueous caustic solution with which the tetrafluoride reacts and from which it cannot be recovered. The processes used heretofore are thus complicated, require elaborate equipment and can result in the destruction of one product. A simplified process to separate sulfur tetrafluoride from sulfur hexafluoride and recover each in pure form is highly desirable.

Sulfur tetrafluoride, being a reactive gas under normal conditions, is difficult to store and handle. A process which will permit storage of the compound as a relatively inert solid or liquid has obvious advantages. Such a process can be made readily available by the provision of solid or liquid addition compounds which easily regenerate sulfur tetrafluoride.

An object of the invention is, consequently, provision of a novel method for separating sulfur tetrafluoride and sulfur hexafluoride, particularly in a synthesis therefor.

A subsidiary object is provision of an improved method for storing and handling sulfur tetrafluoride.

A further object is provision of novel addition compounds or complexes of sulfur tetrafluoride.

The above-mentioned and yet further objects of the invention are achieved in their broadest aspects by a process comprising: (1) bringing impure sulfur tetrafluoride into contact with a tertiary amine at a temperature of 100° C. or lower and a pressure of at least 600 mm. of mercury for a period of time sufficient to permit the sulfur tetrafluoride to form an adduct with the tertiary amine; (2) separating the liquid or solid sulfur tetrafluoride-tertiary amine adduct. and (3) recovering pure sulfur tetrafluoride by dissociating the sulfur tetrafluoride-tertiary amine adduct through application of reduced pressure or heat and drawing off the gaseous sulfur tetrafluoride.

The process is obviously of particular value when used in conjunction with preliminary synthesis steps yielding a mixture of sulfur tetrafluoride and sulfur hexafluoride. It will be understood, however, that the source of the sulfur tetrafluoride is actually immaterial as far as the production of the adduct is concerned, i.e., pure as well as impure sulfur tetrafluoride can be used in synthesizing the adduct. It will also be understood that the time interval elapsing between the second and third steps is unimportant, depending largely on the will of the chemical operator and, to a certain extent, on storage conditions.

The achievement of the process of the invention is based upon the unexpected discovery that sulfur tetrafluoride and a tertiary amine combine in approximately equimolar ratios to form an adduct or complex compound sufficiently stable to be handled in process work and in storage under conditions specified hereinafter but from which the sulfur tetrafluoride can be recovered by suitable treatment. It may be noted that complex compounds, in this instance coordination complexes, are not formed with tertiary amines by either sulfur hexafluoride or disulfur decafluoride.

The stability of the sulfur tetrafluoride-tertiary amine addition product is directly related to the basicity of the amine. It is therefore important in the operation of the process that a tertiary amine be employed which possesses sufficient basicity to form a stable addition product with the sulfur tetrafluoride. Usable tertiary amines are defined as those having only carbon immediately linked to nitrogen, wherein at most one of said carbons is hydrogen free, said nitrogen optionally being a part of a heterocyclic ring of at least six atoms, any multiply-bonded nitrogen being part of said ring, the maximum number of carbon atoms in each substituent on said nitrogen being twelve.

The preferred amines are those that have low vapor pressure at 0° to 100° C. since this property facilitates a clean separation of sulfur tetrafluoride on dissociation of the amine-sulfur tetrafluoride addition product.

The preferred amines are those in which the substituents previously defined are hydrocarbon and oxahydrocarbon groups, each containing from two to eight carbon atoms.

Examples of tertiary amines which are useful in the invention are trimethylamine, tripropylamine, trioctylamine, tridodecylamine, tricyclohexylamine, N-methylmorpholine, pyridine, N,N'-dimethylpiperazine, N,N-dimethylaniline, N-ethylpiperidine, and N,N-dimethylcyclohexylamine.

Although the quantities of the reactants are not critical as far as obtaining some separation of components is concerned, in the preferred form of the invention the tertiary amine and sulfur tetrafluoride are used in a mole ratio of not less than about 1 to 1. If the mole ratio of reactants is less than about 1 to 1, removal of the sulfur tetrafluoride is incomplete and the process must be repeated to obtain full recovery of the desired tetrafluoride. An excess of tertiary amine is not disadvantageous and, in fact, in a process adapted to continuous operation an excess is desirable to assure complete absorption of the sulfur tetrafluoride.

The tertiary amines may be used to react with the sulfur tetrafluoride in pure form or in mixtures. They may also be employed in concentrated solution in solvents that do not react with sulfur tetrafluoride, e.g., heptane or toluene.

The process is conducted under anhydrous conditions because sulfur tetrafluoride and the sulfur tetrafluoride-tertiary amine addition compounds are decomposed by water or other protonic substances, such as alcohols, acids, or primary and secondary amines. These protonic substances interfere with the process since they reduce the amount of recoverable sulfur tetrafluoride in proportion to the quantities in which they are present. If glass is used in the process equipment, the exclusion of water or other protonic compounds must be rigorous because, as the equations cited below show, water is catalytic in the decomposition of a hydrolyzable fluoride in contact with glass:

(1)   $SF_4 + H_2O \rightarrow SOF_2 + 2HF$ and (2)   $4HF + SiO_2 \rightarrow SiF_4 + 2H_2O$ The process may be carried out continuously by passing a gaseous mixture of sulfur tetrafluoride with sulfur hexafluoride or other impurity through a liquid tertiary amine at atmospheric pressure and $-20$ to $+100°$ C. To insure good contact of the gases with the liquid, conventional gas-washing or gas-scrubbing towers are used. Suitable materials of construction for the reaction vessel are "Pyrex" glass, metals such as iron, stainless steel or nickel, and plastics such as polyethylene or polytetrafluoroethylene. The nonabsorbed gas is collected and condensed in a gas cylinder cooled with solid carbon dioxideacetone solution. This condensed gas will consist principally of sulfur hexafluoride with possibly minor amounts of sulfur tetrafluoride. Minor amounts of sulfur tetrafluoride can be present because many of the sulfur tetrafluorideamine addition products have a small, but nevertheless finite dissociation pressure at temperatures around $0°$ C.

The liquid portion of the reaction product, i.e., the part absorbed in the amine, contains unreacted amine and the sulfur tetrafluoride-amine addition product. The sulfur tetrafluoride is recovered most readily by warming the complex to a temperature at which the dissociation pressure is greater than the atmospheric pressure. The sulfur tetrafluoride distills off leaving the amine as a residue. It is collected in cylinders cooled with solid carbon dioxide-acetone solution. Alternatively, the sulfur tetrafluoride may be recovered by reducing the pressure of the system below that of the dissociation pressure of the complex at $-20$ to $+100°$ C. In reactions or conditions where the presence of a tertiary amine is not objectionable, the amine complex may be used directly as a source of sulfur tetrafluoride.

In a batch process, it suffices to charge a vessel with impure sulfur tetrafluoride and tertiary amine, and to agitate the vessel to insure good contact of the gas and liquid phases. The unabsorbed gas, generally sulfur hexafluoride, is collected as described in the preceding paragraph.

The temperature at which the complex-forming reaction is conducted lies between about $100°$ C. and $-20°$ C., the preferred temperature lies between about $50°$ C. and $-20°$ C. At temperatures above $50°$ C. the vapor pressure of some tertiary amine-sulfur tetrafluoride complexes is higher than desirable for complete removal of the sulfur tetrafluoride from the mixture of sulfur tetrafluoride and hexafluoride.

The process is generally conducted at a pressure of 600 mm. of mercury or higher since at lower pressures some of the sulfur tetrafluoride-tertiary amine adducts begin to dissociate appreciably and release sulfur tetrafluoride. The preferred pressure range lies between about 700 mm. and about 2500 mm. of mercury. No advantage is gained by operating at excessively high pressures, that is, pressures of 10 atmospheres or higher.

The following examples will illustrate the process.

*Example 1*

This experiment illustrates the formation of an addition product between sulfur tetrafluoride and the heterocyclic amine, pyridine.

Pyridine was distilled into a glass system of constant volume and the pressure in the system was measured. Sulfur tetrafluoride was then added in portions of known weight to the pyridine at $23°$ C. until somewhat more than one mole per mole of pyridine had been added. The pressure was measured after each addition. With the data obtained, the pressure of the system was plotted against composition of the system and two straight lines were obtained that intersected at a composition in which the mole ratio of sulfur tetrafluoride to pyridine was approximately 1; the actual value found was 0.97. The addition product was a colorless liquid for which the dissociation pressure of sulfur tetrafluoride was approximately 400 mm. of mercury at $23°$ C.

In a second test the order of addition of the reactants was reversed. Sulfur tetrafluoride was introduced into a glass system of constant volume and the pressure of the system was measured at $0°$ C. Pyridine was added to the system at $0°$ C. in portions of known weight until slightly more than one mole per mole of sulfur tetrafluoride had been added. The pressure was measured after each addition. A plot of the pressure of the system against the composition of the system yielded two nearly straight lines which intersected at a composition in which the mole ratio of sulfur tetrafluoride to pyridine was about 1; the actual value found was 0.99. The dissociation pressure of sulfur tetrafluoride over the colorless liquid adduct at $0°$ C. was about 150 mm.

The vessel containing the sulfur tetrafluoride-pyridine adduct obtained above was cooled to $-5°$ C. and connected to a system of traps which were cooled with liquid nitrogen. Upon evacuation of the system, the sulfur tetrafluoride distilled off and was collected in the traps. In this manner 73% of pure sulfur tetrafluoride was recovered in one fractionation.

The pyridine-sulfur tetrafluoride addition product was further characterized by a study of its nuclear magnetic resonance spectrum. Approximately equimolar quantities of pyridine and sulfur tetrafluoride were distilled into a glass capillary and the capillary sealed off. The $F^{19}$ magnetic resonance spectrum of this addition product was examined as a function of temperature. It was found that the spectrum was not dependent on the temperature. The specrum consisted of one sharp resonance that was shifted from the $SF_4$ resonance in the direction expected for a complex of octahedral symmetry. This shift showed that complex formation had occurred and that the structure of the molecule approached octahedral symmetry where four fluorine atoms are probably in a plane and the unshared pair of electrons and the amine are located above and below the plane.

*Example 2*

This example illustrates the use of a trialkylamine, triethylamine, to form an addition product with sulfur tetrafluoride.

Approximately equimolar quantities of triethylamine and sulfur tetrafluoride were distilled into a glass capillary and the capillary sealed off. The $F^{19}$ nuclear magnetic resonance spectrum of this colorless 1:1 liquid addition product of sulfur tetrafluoride and triethylamine was almost identical to that of the pyridine-sulfur tetrafluoride adduct described above.

*Example 3*

This example illustrates the use of a heterocyclic amine, N-methylmorpholine, to form an addition product with sulfur tetrafluoride. It also illustrates the nonreactivity of sulfur hexafluoride towards a tertiary amine.

(a) A glass chamber of 10 milliliters capacity was thoroughly dried and evacuated to a pressure of approximately one micron. The glass chamber was cooled to $0°$ C. and 0.683 gram of N-methylmorpholine was added. Sufficient sulfur tetrafluoride was introduced into the chamber to bring the pressure to 720 mm. of mercury. After standing at $26°$ C. for about ½ hour, 0.81 gram of sulfur tetrafluoride was absorbed as shown by the gain in weight of the tertiary amine layer. This corresponds to a mole ratio of sulfur tetrafluoride to N-methylmorpholine of approximately 1 to 1. The reaction product was a colorless semi-solid mass. When the system was opened and connected to an evacuated trap cooled with liquid nitrogen, the sulfur tetrafluoride in the addition product boiled off and was condensed in the cold trap.

(b) The experiment of (a) was repeated except that sulfur hexafluoride was used in place of sulfur tetrafluoride. There was no drop in total pressure on the system either at 20° C. or at 0° C., indicating that there was no absorption of sulfur hexafluoride.

*Example 4*

This example illustrates the separation of sulfur tetrafluoride from sulfur hexafluoride through the formation of a trialkylamine-sulfur tetrafluoride adduct.

A stainless steel cylinder of 150 milliliters capacity was thoroughly dried and charged with 20 grams of tri-n-butylamine. The cylinder was closed, cooled in solid carbon dioxide-acetone mixture and evacuated. Then a quantity, equivalent in volume to 160 milliliters (under standard conditions), of a mixture of equimolar amounts of gaseous sulfur tetrafluoride and sulfur hexafluoride was condensed into the cylinder. The cylinder was closed and agitated for one hour at about 25° C. It was then cooled to 0° C., opened and a sample of the gas phase analyzed by mass spectrography. The data showed that the gas contained no sulfur tetrafluoride. It consisted solely of sulfur hexafluoride (95%) and small amounts of oxygen, nitrogen, water and carbon dioxide. These latter gases were unavoidably introduced during the analytical procedure.

*Example 5*

This example illustrates the formation of addition products of sulfur tetrafluoride and a tertiary amine at 100° C.

A bomb of 145 milliliters capacity, lined with "Hastelloy" C (a trademark for a well-known alloy of nickel, iron and molybdenum), was charged with 19.8 grams of pyridine. It was cooled with a solid carbon dioxide-acetone solution, evacuated and charged with 30.0 grams of sulfur tetrafluoride. The bomb was sealed and heated under autogenous pressure at 100° C. for 17 hours. The bomb was cooled, opened and the volatile products condensed in a trap cooled with a solid carbon dioxide-acetone solution. The residue in the bomb was a liquid which weighed 28.2 grams. The nuclear magnetic resonance spectrum of this liquid showed it was an addition product of sulfur tetrafluoride and pyridine.

The tertiary amine-sulfur tetrafluoride adducts of this invention are for the most part clear liquids or low-melting solids which fume on exposure to air and which must be kept under anhydrous conditions. The adducts can be stored in sealed containers of glass, stainless steel or other unreactive material. They can be kept safely in these containers at ordinary temperatures although it is preferable that they be stored at a temperature of 10° C. or lower. The adducts can be used as a source of pure sulfur tetrafluoride, as described previously, by being warmed or placed under reduced pressure or they can be used directly as a source of sulfur tetrafluoride in reactions in which the presence of a tertiary amine is not harmful.

An addition reaction of sulfur tetrafluoride such as its interaction with a tertiary amine is unusual. Similar reactions are not known to occur between sulfur tetrafluoride and other organic compounds frequently used as reaction media or as solvents. The $F^{19}$ magnetic resonance spectrum of sulfur tetrafluoride consists of two peaks of equal intensities and these peaks have multiplicities of three. The spectrum is consistent with a molecule with two sets of non-equivalent fluorine atoms. The most likely geometry of the molecule is that of a trigonal bipyramid in which the unshared pair of electrons occupy an equatorial position.

The spectrum of $SF_4$ undergoes a change when the compound is warmed to room temperature. The fine structure is initially lost and the two peaks broaden to the point of disappearance. Finally, at room temperature only one resonance is observed, located midway between the two low-temperature peaks. Such behavior is consistent with a molecule undergoing exchange.

The nuclear magnetic resonance spectra of approximately equimolar mixtures of sulfur tetrafluoride with tetrahydrofuran, toluene, perfluorodimethylcyclohexane, ethyl acetate and tetramethylene sulfide, on the contrary, show no shift of the characteristic fluorine resonances of sulfur tetrafluoride. Although these solvents slow the rate of fluorine exchange between sulfur tetrafluoride molecules through dilution effects, they yield no evidence of interaction with sulfur tetrafluoride nor of specific effects on the fluorine exchange rate.

Since obvious modifications will occur to those skilled in the chemical arts, we propose to be bound solely by the appended claims.

The embodiments of the invention in which an exclusive property or privilege is claimed are defined as follows:

1. In a process for the synthesis of sulfur tetrafluoride which simultaneously produces sulfur hexafluoride therewith, the step of contacting the product mixture containing sulfur tetrafluoride and sulfur hexafluoride with a tertiary amine and thereby forming a sulfur tetrafluoride-tertiary amine adduct, said tertiary amine having (a) the substituents on the nitrogen atom selected from the group consisting of hydrocarbon and monoxahydrocarbon radicals of up to twelve carbons, (b) only carbon immediately linked to the nitrogen and (c) at most one carbon linked to the nitrogen free of hydrogen.

2. The process for removing sulfur tetrafluoride from a mixture thereof with sulfur hexafluoride which comprises contacting the mixture with a tertiary amine and thereby forming a sulfur tetrafluoride-tertiary amine adduct, said tertiary amine having (a) the substituents on the nitrogen atom selected from the group consisting of hydrocarbon and monoxahydrocarbon radicals of up to twelve carbons, (b) only carbon immediately linked to the nitrogen and (c) at most one carbon linked to the nitrogen free of hydrogen.

3. The process of purifying sulfur tetrafluoride contaminated with sulfur hexafluoride which comprises the steps of (1) contacting the sulfur tetrafluoride with a tertiary amine and thereby forming a sulfur tetrafluoride-tertiary amine adduct and (2) subsequently recovering pure sulfur tetrafluoride from the adduct, said tertiary amine having (a) the substituents on the nitrogen atom selected from the group consisting of hydrocarbon and monoxahydrocarbon radicals of up to twelve carbons, (b) only carbon immediately linked to the nitrogen and (c) at most one carbon linked to the nitrogen free of hydrogen.

4. An adduct of sulfur tetrafluoride and a tertiary amine, said tertiary amine having (a) the substituents on the nitrogen atom selected from the group consisting of hydrocarbon and monoxahydrocarbon radicals of up to twelve carbons, (b) only carbon immediately linked to the nitrogen and (c) at most one carbon linked to the nitrogen free of hydrogen.

5. The adduct of claim 4 in which the amine is heterocyclic.

6. The adduct of sulfur tetrafluoride and pyridine.

7. The adduct of sulfur tetrafluoride and N-methylmorpholine.

8. An adduct of sulfur tetrafluoride and a trialkyl amine having up to twelve carbons in each substituent on the nitrogen with at most one carbon linked to the nitrogen free of hydrogen.

9. The adduct of sulfur tetrafluoride and triethylamine.

10. The adduct of sulfur tetrafluoride and tri-n-butylamine.

No references cited.